United States Patent
Thompson

[15] 3,652,075
[45] Mar. 28, 1972

[54] VACUUM CHUCK AND RELATED APPARATUS AND METHODS

[72] Inventor: Sheldon Thompson, 2187 12th St., Sarasota, Fla. 33577

[22] Filed: Nov. 10, 1969

[21] Appl. No.: 875,103

[52] U.S. Cl. .................................................269/21
[51] Int. Cl. .....................................................B25b 11/00
[58] Field of Search.................269/21, 321 A; 90/DIG. 25; 51/235, 362; 279/3; 248/362, 363

[56] References Cited

UNITED STATES PATENTS

| | | | |
|---|---|---|---|
| 2,955,829 | 10/1960 | Brewster | 279/3 |
| 3,004,766 | 10/1961 | Bryant | 269/21 X |

FOREIGN PATENTS OR APPLICATIONS

| | | | |
|---|---|---|---|
| 751,253 | 6/1956 | Great Britain | 51/235 |
| 815,752 | 7/1959 | Great Britain | 269/21 |

*Primary Examiner*—Gil Weidenfeld
*Attorney*—Beveridge & De Grandi

[57] ABSTRACT

A vacuum chuck having a work face including a plurality of linearly extending parallel passages or grooves intersecting each other at right angles to form a rectangular grid pattern. The grooves are dimensioned to receive an elongated rubber sealing member having a closed cell construction. The sealing member is discontinuous so that it may be placed in various different grooves to define a continuous seal in the work face of the chuck with the area enclosed by the sealing member being dependent on the size of the workpiece to be held by the chuck. Passages are provided in the chuck to communicate with the grooves inwardly of the sealing member for transmitting a vacuum in the area enclosed by the seal under the work piece. When handling very thin workpieces, a conversion plate is placed on the work face of the chuck in engagement with the sealing member. The thin workpiece is then placed on the conversion plate and held thereon by vacuum transmitted to the bottom of the work piece by apertures in the conversion plate which register with grooves in the chuck inwardly of the seal. When the work piece is very small in overall length and width, it is positioned by placing it in an aperture of similar shape formed in a "block-in" plate which rests on a conversion plate. The bottom surface of the work piece rests on the conversion plate, and vacuum is applied to the bottom of the work piece through apertures in the conversion plate. The chuck may also be adapted for profiling work pieces by placing an apertured conversion plate on the chuck inwardly of the sealing member. The work piece extends beyond the edges of the conversion plate and in spaced relation to the work face of the chuck to provide sufficient space for profiling.

17 Claims, 8 Drawing Figures

PATENTED MAR 28 1972

INVENTOR
SHELDON THOMPSON

BY Beveridge & DeGrandi

ATTORNEYS

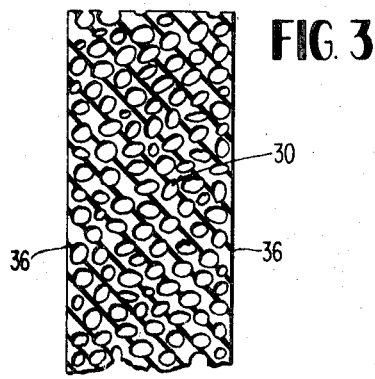
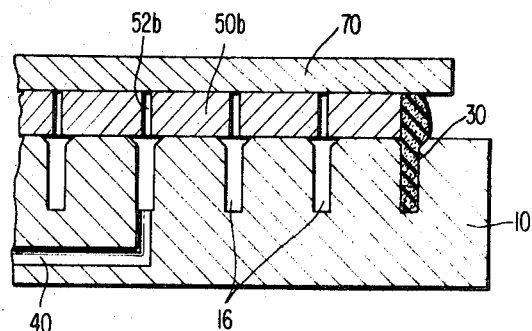
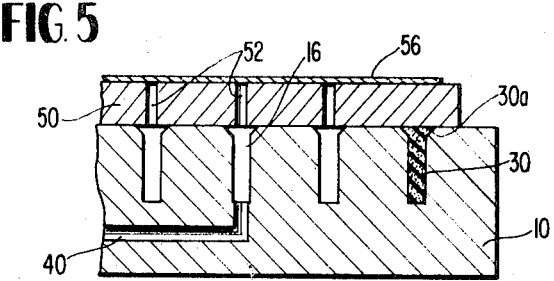
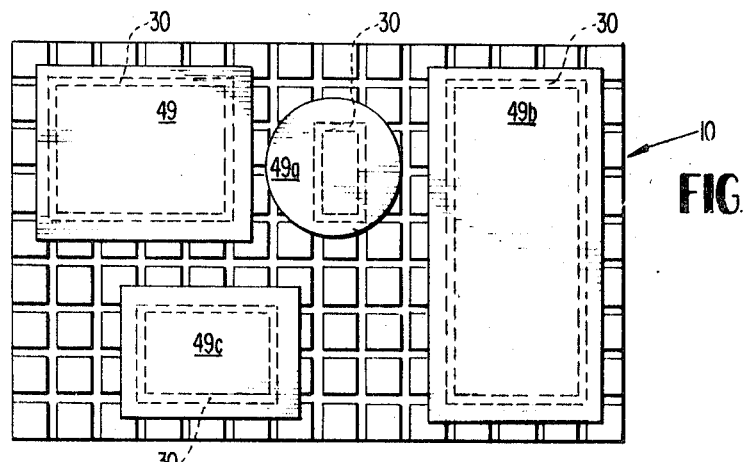

INVENTOR
SHELDON THOMPSON

BY Beveridge & De Grandi

ATTORNEYS

VACUUM CHUCK AND RELATED APPARATUS AND METHODS

SUMMARY OF INVENTION AND OBJECTS

The present invention relates to vacuum chucks and more particularly to improvements in vacuum chucks as well as methods for employing the same to hold work pieces.

One of the objects of the present invention is to provide a novel vacuum chuck which will effectively hold a work piece with efficient application of vacuum.

A further object of the present invention is to provide a vacuum chuck incorporating a novel seal for effectively containing the vacuum employed to hold the work piece.

A further object of the present invention is to provide a vacuum chuck assembly which may be quickly and easily adjusted to hold work pieces of various sizes and shapes including very thin work pieces.

Yet another object of the present invention is to provide a method for adapting a vacuum chuck to hold work pieces of various dimensions and shapes.

Another object is to provide a novel vacuum chuck assembly and method of employing the same to hold a work piece for a profiling operation to be performed on the work piece.

A still further object of the present invention is to provide a vacuum chuck which will achieve the above objects while being relatively economical to manufacture and having a durable construction which will provide dependable service over long periods of repeated use.

In one embodiment, the above objects are achieved in a vacuum chuck having a body made from a suitable lightweight material such as cast aluminum and including a plurality of parallel intersecting grooves in one face thereof which define a generally rectangular grid pattern. The grooves are dimensioned to receive an elongated discontinuous resilient sealing member having a closed cell construction made from any suitable material such as neoprene rubber. The cross section of the seal, which is generally rectangular, corresponds to the shape of the grooves so that the seal may be placed into the grooves to define a continuous seal in accordance with the size of the work piece to be held by the chuck. Vacuum transmitting passages are provided in the chuck body and grooves so that when connected with a suitable vacuum source, and a work piece is placed on the sealing member, the area below the work piece and surrounded by the seal will be evacuated to effectively hold the work piece. Because of the closed cell construction of the sealing member, a small portion thereof which projects upwardly from the work face of the chuck, will expand upon the application of vacuum due to the differential in pressure across the seal. This expansion will occur transversely of the sealing member to increase the sealing engagement with the work piece to be held. In order to release the work piece, the vacuum is released whereby the work piece may be removed from the chuck after which the sealing member may also be removed from the grooves for subsequent use into another set of grooves governed by the size of the work piece.

In cases where the work piece is less than twenty-thousandths of an inch in thickness, to avoid imprinting the work piece as a result of the vacuum pressure applied thereto, a conversion plate is first placed on the work face of the chuck and with the periphery thereof engaged on the seal. The thin work piece is placed on the conversion plate and a vacuum is applied thereto to secure the same through means of apertures in the conversion plate which communicate with the grooves in the chuck.

When it is desired to hold a work piece having relatively short length and width dimensions, a "block-in" plate is employed over a conversion plate for receiving and positioning the workpiece which is received in an aperture in the block-in plate with the bottom surface of the work piece resting on the conversion plate. Thus, when vacuum is applied, the work piece will be held onto the conversion plate by transmission of vacuum to the underside of the work piece through apertures in the conversion plate and the apertures in the blocking plate.

The chuck may also be adapted for holding a work piece which is to be profiled. In this embodiment, a seal having a greater depth is employed to project a greater distance from the work face of the chuck for purposes of receiving a conversion plate which may be termed a "filler plate". The filler plate has a configuration generally conforming to that of the work piece to be profiled however slightly less in cross dimensions so that the work piece will project beyond the edges of the filler plate. In addition, apertures are provided in the filler plate to communicate with the grooves in the work face of the chuck to apply a vacuum to the underside of the work piece. In mounting the work piece, the seal is first placed into the grooves to define the general profile of the work piece. The filler plate is then placed onto the face of the chuck with the seal in surrounding engagement with the edges of the filler plate. The work piece may then be placed on the filler plate after which the vacuum may be applied to secure the work piece.

Other objects and advantages of the present invention will become apparent from the following more detailed description taken in conjunction with the drawings in which:

FIG. 2 is a plan view of the chuck shown in FIG. 1 however additionally showing several work pieces simultaneously held by the chuck;

FIG. 3 is an enlarged, fragmental, cross sectional view of a sealing member employed in the chuck;

FIG. 5 is an enlarged, fragmental, cross sectional view taken generally along lines 5—5 of FIG. 4;

FIG. 8 is an enlarged, fragmental, cross sectional view taken generally along lines 8—8 of FIG. 7.

DETAILED DESCRIPTION

Figure 1:
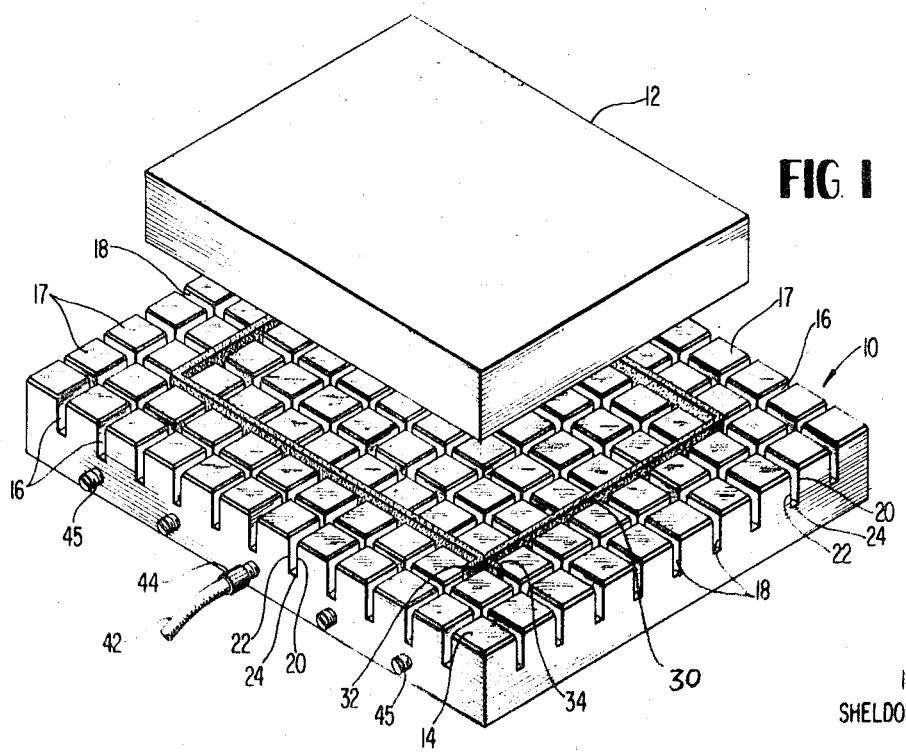
FIG. 1 is a perspective view of a vacuum chuck embodying the present invention and also illustrating a work piece to be held thereby.

Referring now to the drawings in detail, FIG. 1 illustrates a vacuum chuck generally designated 10 embodying the present invention for use in holding a flat work piece such as 12 during an operation on the work piece. In the specific embodiment shown, chuck 10 has a generally rectangular body made from any suitable material such as cast aluminum and includes a top work face 14 in which there are a plurality of intersecting passages or grooves 16, 18. In the specific form illustrated, the passages include a first group of parallel passages 16 and a second group of parallel passages 18 intersecting the first group at right angles. Depending on the specific use of the chuck as well as the size of the work pieces to be held thereby, the grooves are appropriately dimensioned, such as for example one-quarter of an inch to three-quarters of an inch in depth and one-eighth of an inch in width with the side walls 20, 22 extending generally parallel to each other and bottom wall 24 extending generally perpendicularly between the side walls.

Passages 16, 18 are employed to removably receive an elongated flexible and resilient sealing member 30 having a closed cell construction and formed from any suitable material such as neoprene rubber. Sealing member 30 is discontinuous terminating in opposite ends 32 and 34 to enable it to be placed into any group of passages 16, 18 in the chuck to form a continuous seal on the work face of the chuck as illustrated in FIG. 1. In placing sealing member 30 into the chuck passages, it is moved downwardly into the passages until the lower edge of the seal bottoms against the bottom wall 24 of the passages. As indicated in FIG. 3, sealing member 30 has a generally rectangular cross section with opposite sides 36 which are smooth to facilitate insertion of the sealing member into chuck passages 16, 18. The width of sealing member 30 corresponds to the width of passages 16, 18 so that the sealing member fits snugly therein but may be removed for placement into another group of passages.

After the sealing member 30 is placed into the chuck passages to form a continuous seal, the ends 32, 34 thereof are placed into adjacent portions of passages 16 and 18 which extend at right angles thereto as shown in FIG. 1. The discontinuous length of sealing member 30 thus enables it to be adjusted in peripheral length depending on the size of the work piece to be held by the chuck. In addition, to facilitate insertion of the seal in the chuck passages, portions 17 of the chuck body which define the mouths of passages 16, 18 are preferably chamfered or bevelled as shown in FIG. 1

In order to introduce a vacuum for holding the work piece on the work face 14 of the chuck and in sealing engagement with sealing member 30, one or more passages 40 (FIGS. 5 and 8) are formed in the lower portion of the chuck body to communicate with certain passages 16, 18. Although not shown, each passage 40 may communicate with one or more grooves 16 or 18. In the event a groove 16 or 18 which is in communication with a passage 40 is not being utilized, this groove may be closed by inserting in it a sealing member such as 30. In this way the vacuum will not be lost. One or more conduits such as 42 are connected to passages 40 by a suitable coupling 44 for transmitting suction to grooves 16, 18 from a suitable pump, not shown in FIG. 1. The passages 40 not connected to conduits 42 may be suitably plugged by screw plugs 54 which may be removed as desired in order to connect a conduit 42.

Instead of employing a plurality of passages 40, a single such passage 40 may be employed in combination with a plurality of vacuum transmitting grooves (not shown) formed in the underside of the chuck body in communication with the single passage 40 and certain chuck passages 16, 18. In operation, such grooves would be closed to contain the vacuum by inserting a seal therein such as seal 30.

In a typical operation, sealing member 30 is placed into a selected number of passages 16, 18 in the chuck depending on the size of the work piece to be held. After sealing member 30 is properly placed in the chuck and its ends 32, 34 secured in adjacent passages, the work piece is placed on sealing member 30 to entirely cover the same. At this point the work piece will be spaced slightly above work face 17 of the chuck since sealing member 30 is dimensioned to project slightly above, for example, one-thirtysecond of an inch, the work face of the chuck. Vacuum is then introduced into chuck passages 16, 18 inwardly of sealing member 30 whereupon the work piece will be drawn down onto the work face of the chuck with sealing member 30 expanding across its upper surface into enhanced sealing engagement with the work piece. In view of the closed cell construction of sealing member 30 as diagrammatically illustrated in FIG. 3, the volume of gas in the cells remains constant. Thus, when the area below the work piece inwardly of the seal is evacuated, the upper portion of the sealing member will expand transversely and upwardly because of the differential in pressure across the sealing member. This expansion of sealing member 30 increases the sealing contact with the work piece thereby effectively maintaining the vacuum. The upward expansion of the seal is, of course, limited by the work piece; however, in cases where the work piece has ridges or other depressions in its bottom surface, the upward expansion of the seal would fill these ridges to insure that a seal is established for maintaining the vacuum.

In order to release the work piece such as after the operation thereon is concluded, the vacuum is released, thereby breaking the seal between sealing member 30 and the work piece which may then be removed. After the work piece is removed, sealing member 30 may be maintained in the passages of the chuck or may be removed and placed into another group of passages to adapt the chuck for a different size work piece.

Referring to FIG. 2, there is illustrated one of the many advantages of the present chuck wherein a plurality of work pieces 49, 49a, 49b, and 49c, may be held on a single chuck at the same time. In this instance four work pieces are shown each of which has an associated sealing member 30. In this particular application shown in FIG. 1, the chuck may be used to hold work pieces for a drilling operation, for example.

Figure 4:
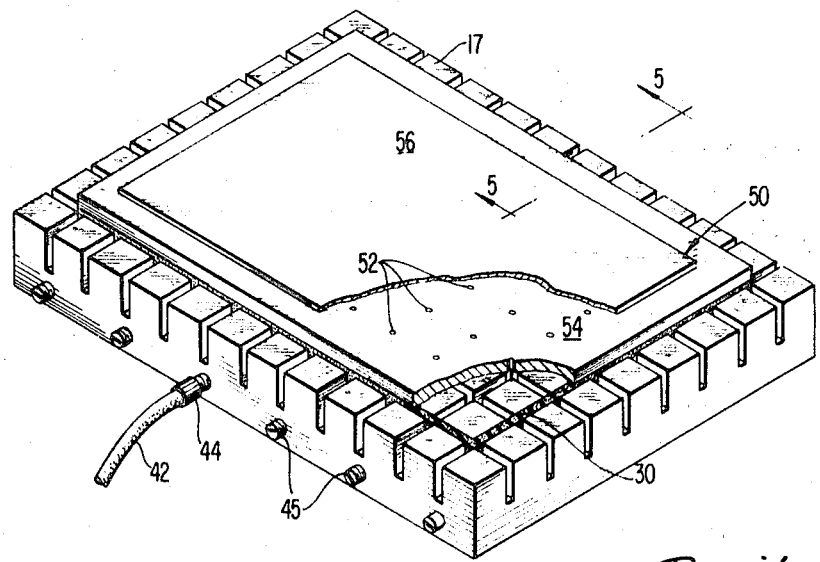
FIG. 4 is a perspective view of a chuck adapted for holding very thin work pieces, portions of a work piece and an associated conversion plate being broken away for clarity.

In situations where the work piece is exceedingly thin say for example twenty-thousandths of an inch or less, application of the vacuum to the thin work piece using the chuck embodiment of FIG. 1 may result in undesirably imprinting the work piece with the outline of the seal due to the force with which the work piece is held on the chuck by the vacuum. Referring to FIG. 4, to avoid this imprinting, a conversion plate 50 is employed. Conversion plate 50 has a generally rectangular shape in the specific embodiment shown and includes a plurality of apertures 52 which extend transversely therethrough. Conversion plate 50 may be made from any suitable material such as aluminum and it is preferable that the upper surface 54 be roughened for purpose to be subsequently described. In use, conversion plate 50 is placed on work face 17 of the chuck and with its underside in engagement with sealing member 30. The thin work piece 56 is then placed on top surface 54 of the conversion plate 50 in covering relation to the apertures 52 of the conversion plate which lie within the confines of the seal. Although in the shown embodiment in FIG. 4 all the apertures 52 are within the seal, in other cases where a smaller work piece is being held, the seal may be relocated to enclose a smaller area so that the work piece will cover all those apertures 52 located inwardly of the seal 30.

Apertures 52 in the conversion plate are positioned thereon so that when it is placed on the chuck, the apertures will register with certain passages 16, 18 in the chuck. In order to secure the workpiece 56, vacuum is applied to the chuck passages which will be transmitted to the underside of work piece 56 by means of apertures 52 in the conversion plate. The roughened top surface 54 of the conversion plate ensures that the air is evacuated between work piece 56 and conversion plate 50. It will therefore be seen that by using conversion plate 50 the thin work piece 56 may be securely held on the chuck without any resulting imprinting thereon due to the relatively high vacuum forces. Conversion plate 50 of course is made of sufficient thickness so that it will not be imprinted or deformed by the sealing pressure resulting from the vacuum applied thereto.

Referring to FIG. 5, there is illustrated one of the vacuum transmitting passages 40 in the body of the chuck which corresponds with certain of the passages 16, 18. Additionally shown in FIG. 5 are apertures 52 in conversion plate 50 which register with passages 16 in the chuck body. The expansion of the upper portion 30a of sealing member 30 is also illustrated in FIG. 5.

Figure 6:
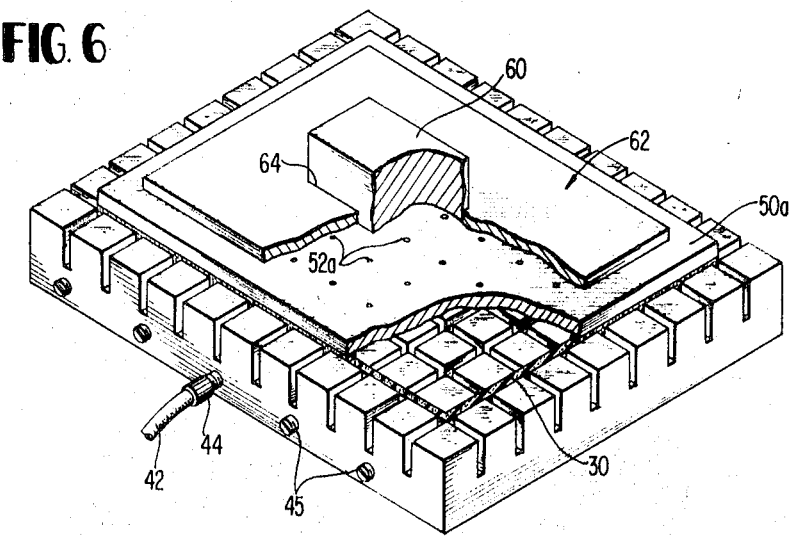
FIG. 6 is a perspective view of a chuck adapted for holding a small work piece; portions of the work piece and associated conversion and block-in plates being broken away for clarity.

Referring now to FIG. 6, when it is desired to hold a work piece having small width and length dimensions such as 60, a further conversion plate 62, which may be termed a "block-in," is employed as illustrated. In this embodiment, placement of sealing member 30 is the same as that of FIG. 4. Placement of a conversion plate 50a is also the same as conversion plate 50 in the FIG. 4 embodiment.

However, in this application, block-in plate 62 is used to position and hold work piece 62 on conversion plate 50a. This is accomplished by a relatively large aperture 64 formed in block-in plate 62 to receive work piece 64 with the bottom surface of work piece 64 resting on conversion plate 50a. In using this assembly, after conversion plate 50a is properly positioned on the work face chuck in engagement with sealing member 30, block-in plate 62 is then placed over conversion plate 50a with apertures 52a of conversion plate 50a registering below aperture 64 in block-in plate 62. Work piece 60 is then placed into aperture 64 of block-in plate 62 whereby upon application of vacuum, apertures 52a in conversion plate 50a will transmit the vacuum to the underside of work piece 60 to securely hold the same on the conversion plate 50a which in turn is held by vacuum on the work face of the chuck. Although only one aperture 64 in the block-in plate 62 is shown for holding a single work piece 60, it will be apparent that a block-in plate having several apertures 64 for simultaneously holding several work pieces may also be employed within the concept of the present invention.

Figure 7:
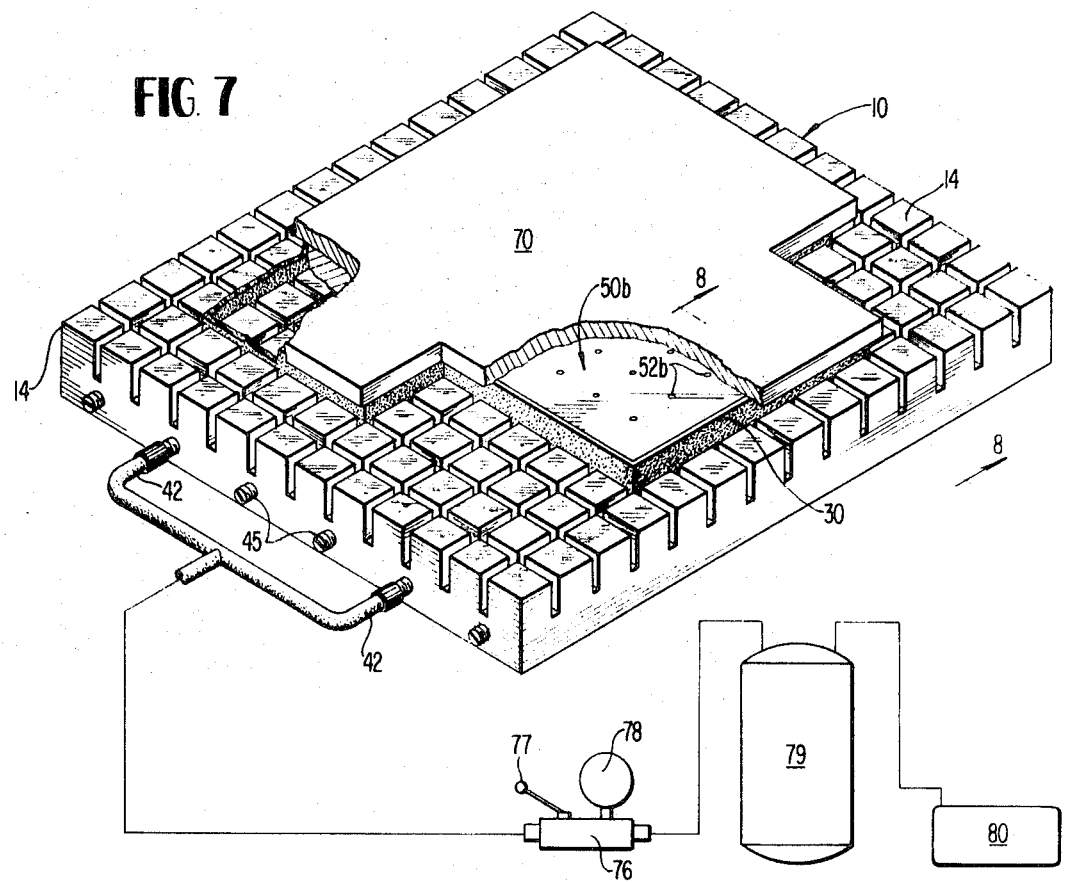
FIG. 7 is a perspective view of a chuck adapted for holding a work piece to be profiled with portions of the work piece and an associated conversion plate being broken away.

Referring now to FIGS. 7 and 8, the chuck of the present invention may also be adapted for use in holding a workpiece 70 on which a profiling operation is to be accomplished. In this embodiment, sealing member 30 is generally the same as that described above with the exception, however, that sealing member 30 has a greater width to extend a greater distance, for example nine-thirtyseconds of an inch above the work face 14 of the chuck. The purpose of this is to enable sealing member 30 to enclose a conversion or "filler" plate 50b which rests on the work face of the chuck and has a profile generally corresponding to the profile which is to be produced on the work piece 70. Conversion plate 50b is similar to conversion plate 50 described above and has a plurality of apertures 52b positioned to register with passages 16, 18 in the chuck body for purposes of transmitting vacuum to the underside of work piece 70. The thickness of conversion plate 50b in this embodiment which may be one-fourth of an inch for example, is made sufficient to enable work piece 70 to be held sufficiently spaced from work face 14 of the chuck to allow the profiling operation to be performed. For the same reason, the cross dimensions of conversion plate 50b are less than those of the work piece 70 so that the latter will project laterally beyond the conversion plate 50b.

In mounting the work piece, sealing member 30 is first placed into the appropriate passages 16, 18 in the chuck to define a continuous seal corresponding to the profile which is to be formed on the work piece. Conversion plate 50b is then cut or preformed to fit within sealing member 30 and on the work face of the chuck. After conversion plate 50b is so placed on the work face of the chuck and with the sealing member surrounding and engaging it, work piece 70 is then properly positioned on conversion plate 50b and sealing member 30. The vacuum may then be applied to draw work piece 70 firmly down on conversion plate 50b with sealing member 30 establishing an effective seal with the work piece as illustrated in FIG. 8.

FIG. 7 also diagrammatically illustrates one vacuum system which may be applied for supplying the vacuum; it including a control valve 76 having an operating handle 77 and a vacuum gauge 78; a collection tank 79 connected to the control valve; and a vacuum pump 80 connected to the collection tank. It will be appreciated that any other suitable system may also be employed in connection with the present invention.

Although in the specific embodiments illustrated and described above, the grooves 16 and 18 intersect each other at right angles, it will be appreciated that the grooves 16 and 18 may be arranged to intersect at different angles within the concept of the present invention. Moreover, the grooves 16, 18 may extend in curved fashion, rather than linearly as illustrated and described.

I claim:

1. A vacuum chuck comprising a body having a generally planar work face and a plurality of intersecting passages in the work face, passage means in the body communicating with a number of said passages for transmitting vacuum thereto, and an elongated discontinuous seal having a resilient closed cell construction dimensioned to be placed into said passages to form a continuous seal slightly above the work face of the chuck, said seal being removable from said passages in the chuck for subsequent placement in other passages depending on the size of the work piece to be held by the chuck, said intersecting passages including at least a first pair of passages laterally spaced from each other and extending in the same general direction, and a second pair of passages laterally spaced from each other and extending in the same direction while intersecting said first pair of passages.

2. The chuck defined in claim 1 wherein said seal has a generally rectangular cross section corresponding to the cross section of said passages in the chuck, and said seal has a thickness dimensioned to snugly fit in said passages in the chuck.

3. In combination with the chuck defined in claim 1, a rigid conversion plate dimensioned to be placed on the work face of the chuck in engagement with said seal for receiving a thin work piece, said conversion plate having a plurality of apertures extending transversely therethrough positioned to communicate with passages in the chuck for purposes of transmitting a vacuum to the underside of said work piece.

4. The combination defined in claim 1 further including a rigid conversion plate dimensioned to be placed on the work face of the chuck in engagement with the seal, said conversion plate having at least one aperture extending transversely therethrough for communicating with one of the passages in the chuck, a rigid block-in plate dimensioned to be placed on the conversion plate and having an aperture with the same configuration but with a slightly greater size than the periphery of the work piece for receiving a work piece with the underside of the work piece resting on the conversion plate over the aperture in the conversion plate whereby upon application of vacuum, the conversion plate will be held on the work face of the chuck and the work piece will be held on the conversion plate.

5. A vacuum chuck assembly comprising in combination, a chuck body having a work face including a plurality of intersecting passages therein, an elongated discontinuous resilient seal dimensioned to be selectively placed in said passages to define a continuous seal above the work face of the chuck, said chuck body having passage means communicating with a number of said passages in the work face and adapted to be connected to a source of vacuum, and a rigid conversion plate dimensioned to be placed on the work face with portions thereof engaged on said seal, said conversion plate having an upper face dimensioned to receive a flat work piece, and a number of apertures in said conversion plate dimensioned to communicate with passages in said chuck body to transmit vacuum to the underside of said work piece.

6. The vacuum check assembly defined in claim 5 wherein said passages include a first group of parallel passages with a second group of parallel passages intersecting said first group at right angles.

7. The vacuum chuck assembly defined in claim 6 wherein said conversion plate has a roughened upper surface for enhancing transmission of vacuum thereacross.

8. The chuck assembly defined in claim 5 further including a rigid block-in plate dimensioned to be placed on said conversion plate and having an aperture with the same configuration but with a slightly greater size than the periphery of the work piece for receiving a work piece with the work piece engaged on the conversion plate over the apertures therein such that suction may be transmitted to the underside of the work piece, held in the block-in plate aperture.

9. A vacuum chuck assembly comprising a chuck body having a work face including a plurality of intersecting passages therein and means in said chuck body for transmitting a vacuum to said passages, a resilient seal dimensioned to be selectively placed in a number of said passages to define a continuous seal above the work face of the chuck, and a filler plate received on the work face of the chuck with the seal surrounding and in engagement with the peripheral edge of the filler plate, said seal dimensioned to project slightly above the plane of the filler plate when the seal is received in said passages, said filler plate having a plurality of apertures extending transversely therethrough for communicating with the passages in said chuck body whereby a work piece may be held by vacuum on the filler plate and with its peripheral edges extending outwardly beyond the filler plate and seal.

10. The vacuum chuck assembly defined in claim 9 wherein said passages in the work face of the chuck include a first group of parallel passages and a second group of parallel passages intersecting said first group at right angles.

11. The vacuum chuck assembly defined in claim 10 wherein said seal is flexible and elongated and discontinuous to allow it to be removed from passages in the chuck for placement into other passages to define a different pattern.

12. The vacuum chuck assembly defined in claim 11 wherein said seal is formed from a closed cell rubberlike material.

13. A method of holding a work piece on a vacuum chuck for performing a profiling operation on the work piece, comprising the steps of placing a sealing member in the work face of the chuck to define a profile generally corresponding to the profile to be performed on the work piece placing a filler plate having generally the same profile as said profile defined by the seal on the work face of the chuck inwardly of the seal but in engagement with the seal, placing the work piece on the filler plate and in engagement with the upper edge portions of the seal and with the peripheral edge portion of the work piece projecting laterally beyond the seal, and applying a vacuum to the underside of the filler plate and the underside of the work piece to secure the same while using the seal to contain the vacuum.

14. A vacuum comprising a body having a generally planar work face and a plurality of intersecting passages in the work face, passage means in the body communicating with a number of said passages for transmitting vacuum thereto, and an elongated discontinuous seal dimensioned to be placed into said passages to form a continuous seal above the work face of the chuck, said seal being removable from said passages in the chuck for subsequent placement in other passages depending on the size of the work piece to be held by the chuck, said passages including a first group of generally parallel passages and a second group of generally parallel passages intersecting said first group of passages, said seal having opposite ends adapted to be placed at an angle to each other into adjacent portions of passages in said first and second groups with the remaining intermediate portion of the seal extending in a generally polygonal pattern through said passages.

15. The chuck defined in claim 14 wherein said seal has a generally rectangular cross section corresponding to the cross section of said passages in the chuck, and said seal has a thickness dimensioned to snugly fit in said passages in the chuck.

16. The chuck defined in claim 15 wherein the portions of the chuck defining the mouths of said passages in the work face are beveled.

17. The chuck defined in claim 15 wherein the opposite sides of the seal are relatively smooth to facilitate insertion into and removal from the passages in the chuck.

* * * * *